May 14, 1929.  A. G. MARANVILLE  1,712,965
LAMINATED BOARD AND METHOD OF MAKING SAME
Filed April 21, 1927
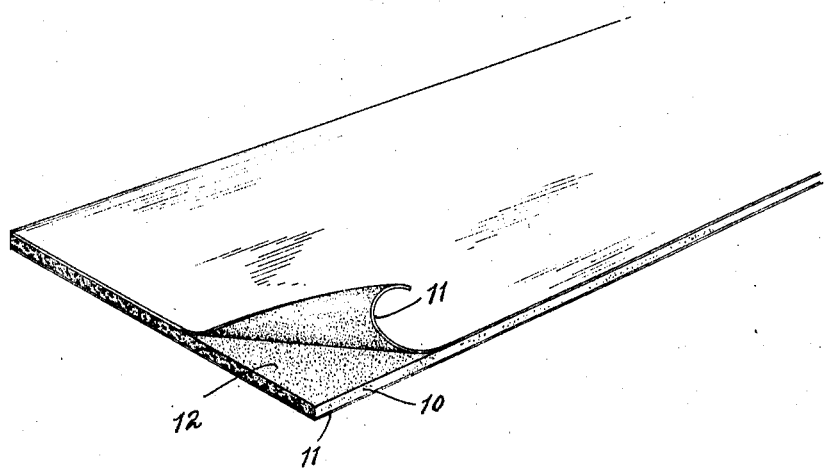
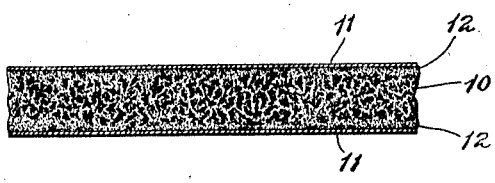
Inventor
Alger G. Maranville
By Pierson, Eakin & Avery,
Attys.

Patented May 14, 1929.

1,712,965

UNITED STATES PATENT OFFICE.

ALGER G. MARANVILLE, OF AKRON, OHIO, ASSIGNOR TO THE B. F. GOODRICH COMPANY, OF NEW YORK, N. Y., A CORPORATION OF NEW YORK.

LAMINATED BOARD AND METHOD OF MAKING SAME.

Application filed April 21, 1927. Serial No. 185,442.

This invention relates to structural materials and its object is to provide a manufacture of this class combining in a greater degree than heretofore certain desirable qualities such as strength, lightness, low cost and easy workability adapting it for use in a variety of situations where such qualities are important, for example in air-craft construction.

Of the accompanying drawings, Fig. 1 is a perspective view showing a composite board embodying my invention, with a portion of one of the metallic facing layers stripped back at a corner thereof.

Fig. 2 is a cross-section of the composite board.

Referring to the drawings, 10 is a layer of cellular material characterized by substantail firmness or rigidity, such as sponge hard rubber, obtained by incorporating in a rubber compound sufficient sulfur to vulcanize it to a hard condition, together with a suitable blowing agent, and an accelerator if desired, and then vulcanizing for the necessary length of time.

This cellular layer is faced on at least one side with a thin sheet of metal, and in this instance I have shown two such metal facing sheets 11 on opposite sides of the layer 10. While various metals such as steel, zinc, copper, or brass or other alloy may be employed, I prefer, for uses where extreme lightness is a primary consideration, to employ aluminum, under which term are included alloys of aluminum such as "duralumin."

It is essential that the metallic facings 11 shall be bonded to the cellular hard rubber 10 in such manner that a durable adhesion is obtained, capable of remaining permanent under bending, denting and other stresses to which the material is subjected in use, and also adapted to withstand the operations which may be employed in fabricating the material into structures, attaching it to other parts, etc., such as sawing, drilling, nailing, screwing or riveting.

Generally speaking, the direct adhesion of hard rubber to plane metal surfaces is very weak, and this is particularly true in the base of aluminum and its alloys. The composite structure therefore includes a bonding or cementing layer 12 between the cellular hard rubber layer 10 and each of the metal facing layers 11, these bonding layers being flexible or non-brittle and of such nature as to adhere both to the rubber and the metal. The bonding layer may be applied in solution or otherwise. While a rubber or other cement adapted to cure to a semi-hard condition might be employed, I prefer to employ for the cementing or bonding substance a tough, balata-like, thermoplastic, artificial derivative or isomer of rubber prepared by reacting undissolved rubber under the influence of heat with p-phenol sulfonic acid or equivalent reagent, as described in Example 2 of patent to H. L. Fisher, No. 1,605,180, dated November 2, 1926.

The metallic facing sheets 11 may be applied to the layer 10 either before or after the latter has assumed its cellular, rigid condition. In either case the adhering face of the metal sheet is thoroughly cleaned, as by pickling and sand-blasting, the bonding layer is applied, as by painting it on the cleaned metal surface, and is allowed to dry to a tacky condition, and the sticky-faced metal sheet is then applied to the rubber sheet and caused to adhere thereto, preferably with the aid of heat and pressure. The bonding layer may itself be of a composite nature, the first part being baked on the metal, in which case it is preferred to incorporate in the balata-like, rubber reaction product for the baking layer a small proportion of a drier such as the oleate or linoleate of manganese, lead or cobalt; and the second part being said reaction product without the drier, laid thinly over the baked layer.

When the metallic facing sheet or sheets are applied to the rubber sheet before vulcanization of the latter, the rubber compound can be calendered or otherwise laid upon the sticky-faced metal sheet, overlaid with a similar metal sheet if the board is to be armored on both sides, the article placed between steam-heated press platens with sufficient clearance between it and the upper platen to allow for the desired ultimate thickness, and there vulcanized, the rubber being sponged by the blowing agent contained therein and the heat and pressure causing a firm adhesion between it and the facing sheets through the bonding layers.

The result is a composite or laminated board of great lightness and strength peculiarly adapted for use in aircraft construction or in other situations where these qualities are desired. This material has most of the advantages of wood and many superiorities thereover. It can be readily sawed without splitting or shattering, and attached with nails, screws, bolts or rivets. It is weatherproof, watertight, practically non-inflammable and will stand rough usage. Its resistance to bending is much greater than that of either component alone.

The described embodiment may be considerably varied without departing from my invention as defined in the appended claims.

I claim:

1. Laminated structural material comprising a layer of cellular hard rubber, and a metal sheet united therewith by a flexible bond.

2. Laminated structural material comprising a layer of cellular hard rubber, and a metal sheet united therewith by a bonding layer consisting of a heat-plastic reaction product of rubber.

3. Structural material comprising a body of cellular hard rubber, and a metal facing sheet united therewith by a bonding layer consisting of a balata-like, heat-plastic, artificial isomer of rubber.

4. Structural material comprising a body of cellular hard rubber, and a metallic member united therewith by a flexible, composite bond, said bond consisting of a part baked upon the metal and another part uniting the first-said part to the rubber.

5. Laminated structural material comprising a layer of cellular hard rubber located between two metal sheets and united thereto by flexible bonding layers.

6. Laminated structural material comprising a layer of cellular hard rubber located between two sheets of aluminum and united thereto by flexible bonding layers.

7. Laminated structural material comprising a layer of cellular hard rubber located between two sheets of aluminum and united thereto by flexible bonding layers composed of a balata-like, heat-plastic artificial isomer of rubber.

8. Laminated structural material comprising two facing sheets of metal and a layer of hard sponge rubber lying between them and firmly united with each of the sheets in extensive face-to-face relation.

9. Laminated structural material comprising a facing sheet of metal and a layer of hard sponge rubber united therewith in extensive face-to-face relation.

In witness whereof I have hereunto set my hand this 19th day of April, 1927.

ALGER G. MARANVILLE.